United States Patent

Kohanzadeh et al.

[11] 3,960,531
[45] June 1, 1976

[54] METHOD AND APPARATUS FOR SPLICING OPTICAL FIBERS

[75] Inventors: Youssef Kohanzadeh, Corning; Roy E. Smith, Horseheads, both of N.Y.

[73] Assignee: Corning Glass Works, Corning, N.Y.

[22] Filed: July 28, 1975

[21] Appl. No.: 599,854

[52] U.S. Cl. .................................. 65/4 B; 65/40; 65/42; 65/152; 65/DIG. 7; 219/57; 219/58; 219/123
[51] Int. Cl.² .................................. C03B 23/20
[58] Field of Search............ 65/4 B, 40, 42, DIG. 7, 65/152; 219/123, 58, 57

[56] References Cited
UNITED STATES PATENTS

| | | | |
|---|---|---|---|
| 1,711,151 | 4/1929 | Lincoln | 219/123 X |
| 2,902,573 | 9/1951 | Guyer | 219/123 X |
| 3,611,191 | 10/1971 | Altman | 219/123 X |
| 3,893,837 | 7/1975 | Gasbarrow | 65/40 X |

OTHER PUBLICATIONS

American Telephone and Telegraph Co., The Bell System Technical Journal vol. 50, No. 10, Dec. 1971, pp. 5153–5158.

*Primary Examiner*—Robert L. Lindsay, Jr.
*Attorney, Agent, or Firm*—William J. Simmons, Jr.; Walter S. Zebrowski; Clarence R. Patty, Jr.

[57] ABSTRACT

A method and apparatus are described for permanently splicing glass optical fibers. The fibers are aligned colinearly, and their ends are brought into contact. Electric and magnetic fields are generated in the vicinity of the fiber end portions. The electric field creates an arc which moves along the fiber junction under the influence of the magnetic field, thereby ensuring complete fusing of the fiber endfaces.

12 Claims, 4 Drawing Figures

METHOD AND APPARATUS FOR SPLICING OPTICAL FIBERS

CROSS-REFERENCE TO RELATED APPLICATION

This application is related to application Ser. No. 599,853, filed July 28, 1975 entitled "Method and Apparatus for Splicing Optical Fibers" filed by R. E. Smith on even date herewith.

BACKGROUND OF THE INVENTION

1. Field of the Invention

This invention relates to a method and apparatus for splicing light transmitting fibers such as, for example, optical waveguides.

High capacity communication systems operating around $10^{15}$ Hz are needed to accommodate future increases in communication traffic. Optical waveguides, which are the most promising medium for transmission at such frequencies, normally consist of an optical fiber having a transparent core surrounded by transparent cladding material. Very low loss glass optical fibers have been produced in accordance with the methods disclosed in U.S. Pat. Nos. 3,775,075 and 3,711,262 issued to D. B. Keck et al. Because of the low losses of such fibers, light can be propagated therethrough many kilometers without the need for repeaters. When the length between repeaters exceeds the length which can be drawn, a plurality of fibers must be connected to provide the desired length. Also, a low loss method is needed for connecting broken fibers. A permanent splice is more desirable than a simple connector in these instances. A splice avoids the inherent Fresnel loss experienced in connectors and does not require bulky fiber supporting structure associated with connectors wherein the endfaces of two adjacent fibers are merely secured together in light transmitting alignment.

2. Description of the Prior Art

Permanent optical fiber connections have been made by applying a transparent bonding material to the fiber ends while they are held in axial alignment. A chemically set glue typically requires several hours to cure. A thermoplastic bonding material has also been employed. Fibers are aligned colinearly and a quantity of low melting point transparent thermoplastic is inserted at the junction thereof. Heat is applied to melt the thermoplastic causing it to flow around the fiber ends. A sleeve has been employed with both chemically cured and thermoplastic bonding materials, the bonding material being introduced through a hole in the sleeve after the fibers have been inserted. Even though attempts are made to match the refractive index of the bonding material to that of the fiber core material, the slight discrepancy which invariably occurs introduces losses due to reflection. Moreover, the sleeve which adds strength to the fiber junction and assists in the axial alignment of the fibers causes the splice to be undesirably bulky. When using such sleeves, the tolerance between the fiber and the inner surface of the sleeve must be very close, i.e., about 1 $\mu$m, to keep the fibers properly aligned, and such a tolerance is difficult to obtain. Furthermore, bubbles can form at the fiber junction inside sleeve joints, thereby rendering them useless. When epoxy is employed alone at the fiber joint, the resultant joint is too weak to keep the fiber ends aligned when transverse pressure is applied.

Fibers consisting of low melting point material have been thermally fused, end to end, to provide a good mechanical joint having low transmission loss. In accordance with this technique, the fiber ends are aligned, leaving a space therebetween for thermal expansion. Current is passed through a resistance wire surrounding the fiber ends causing the wire to heat up and fuse the ends together. When the fiber is heated, the longitudinal expansion thereof closes the gap left between the fiber ends. Because of the length of fiber which is heated by the loop of resistance heating wire the effect of gravity causes poor alignment of the cores of the fibers unless they are vertically disposed during the splicing process. Good mechanical joints can be made having transmission losses as low as about 0.5 dB on fibers of glass having a softening temperature of about 700°C. However, fibers of high silica content glass such as those described in the aforementioned Keck et al. patents, cannot be joined by this technique, since temperatures up to about 1600°C are required. Moreover, when the hot wire butt-fusion method is employed to splice single mode waveguides, losses are much greater than for splicing multimode waveguides, maximum coupling efficiencies of only 70% being reported and reproducibility being poor.

SUMMARY OF THE INVENTION

Accordingly, it is an object of the present invention to provide a method of splicing optical fibers of glass having a high softening temperature.

Another object of the present invention is to provide a method for splicing optical fibers regardless of the softening point of the material thereof.

Yet another object is to provide a method of splicing optical fibers without utilization of bulky reinforcing means.

Still another object of the present invention is to provide a simple and rapid technique for providing a mechanically strong, low loss splice between optical fibers.

Still another object of the present invention is to provide a method of forming optical fiber splices that are substantially free from Fresnel reflections.

The foregoing and other objects of the invention are realized in an illustrative embodiment wherein first and second fibers to be spliced are axially aligned, and their ends are brought into contact. An electrical field is generated at the junction between the fibers which is of sufficient magnitude to create an electric arc which produces a sufficient amount of heat to melt the ends of the fibers and cause them to fuse. A magnetic field is generated in the vicinity of the fiber junction, the magnetic field having a component parallel to the axes of the fibers. One of the electric and magnetic fields varies with respect to time whereas the other is invariable with respect to time.

In accordance with this invention a splice between optical fibers can be made quickly and simply and results in a negligible loss at the junction. The splice possesses good strength without the need for sleeves or other mechanical supporting structure.

DETAILED DESCRIPTION

Figure 2:
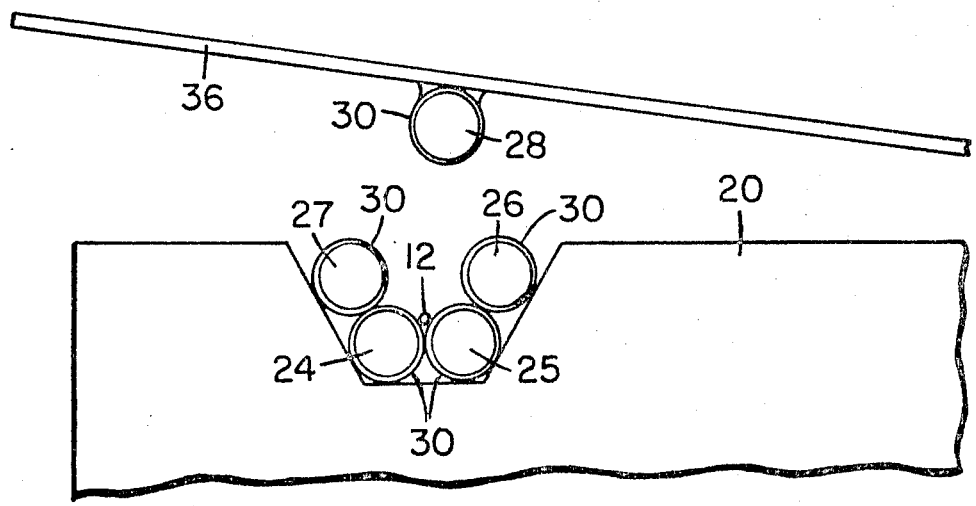
FIG. 2 is a fragmentary end view of the apparatus of FIG. 1.

Referring to the drawings, fibers 12 and 14 are supported by retaining means 16 and 18 which are disposed in micropositioner stands 20 and 22, respectively. The surface of each of the micropositioner stands contains a groove in which a plurality of cylindrically shaped permanent magnets are disposed. In stand 20, for example, magnets 24–28 are disposed in groove 34. Fiber 12 is supported in the aperture formed between magnets 24, 25 and 28. As illustrated in FIG. 2, magnet 28 is secured to a leaf spring 36 so that it may be lifted out of groove 34 to permit insertion of fiber 12. The remaining magnets 24–27 are affixed to the surfaces of groove 34. After fiber 12 is placed into contact with magnets 24 and 25, as illustrated in FIG. 2, spring leaf 36 is released, thereby permitting magnet 28 to tightly secure fiber 12. As illustrated in FIG. 2, the magnets may be provided with a coating 30 of a material such as plastic to prevent the surface of fiber 12 from becoming scratched. In a similar manner fiber 14 can be inserted into retaining means 18. The length of the magnets must be sufficient to cause the end portions of the fibers to extend therefrom in a direction parallel to the axes of the magnets. Due to the stiffness of the fibers and the small distance between members 20 and 22, the axes of the fiber end portions remain substantially linear.

As indicated by the double headed arrow, stand 22 is movably mounted on base member 40 in such a manner that fiber 14 can be moved into contact with fiber 12. The crossed arrows on stand 20 indicate that it can be moved in two directions so that the axis of fiber 12 can be displaced in any direction with respect to the axis of fiber 14, the axes of these two fibers remaining substantially parallel.

Figure 1:
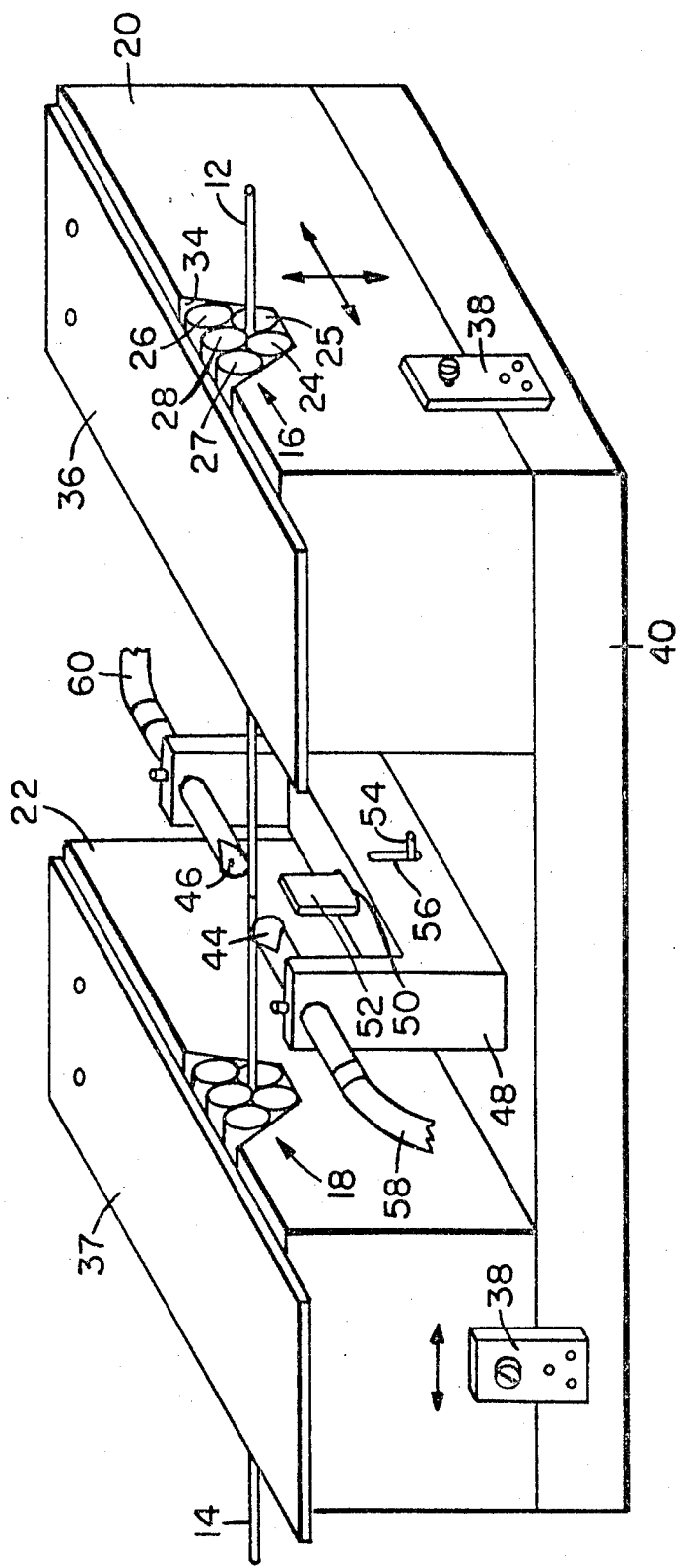
FIG. 1 is an oblique view of an apparatus for splicing optical fibers in accordance with the present invention.
Figure 3:
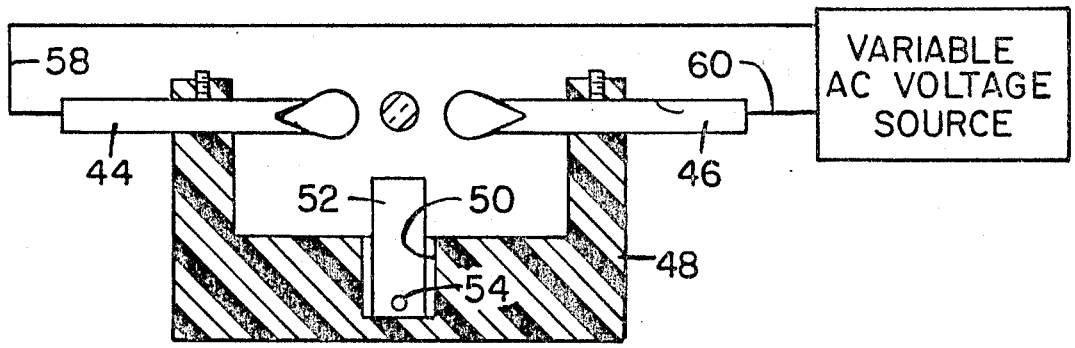
FIG. 3 is a cross-sectional view of an electrode support member.

It is conventional to observe the fiber end portions through a microscope while they are being aligned by the movement of the micropositioner stands. In some uses of the splicing apparatus of FIG. 1, wherein splices must be made very quickly, the use of a microscope may be omitted provided that the fiber retaining means 16 and 18 are constructed with such precision that the longitudinal axes of the apertures in which fibers 12 and 14 are disposed are colinear. The need for a microscope could also be obviated by adjusting micropositioner stands 20 and 22 to obtain alignment of two test fibers of the size that are to be spliced and then tightening locking mechanisms 38 to prevent further movement thereof. Fibers that are thereafter inserted into retaining means 16 and 18 will be aligned. The operator should observe the fiber end portions through a magnifying glass to ascertain the condition of the fiber endfaces and to check for fiber misalignment. As illustrated in FIGS. 1 and 3, electrodes 44 and 46 are secured in apertures formed in U-shaped support member 48. The base of member 48 contains a slot 50 in which a thin rectangularly shaped sheet 52 is disposed. A pin 54, which is affixed to sheet 52, protrudes from a slot 56 in a side surface of base member 48. The endface of fiber 12 is acurately positioned between electrodes 44 and 46 by lifting pin 54 which causes sheet 50 to extend between electrodes 44 and 46. Spring leaf 36 is then lifted while fiber 12 is moved into engagement with sheet 52 which is then permitted to fall back into slot 50. Thereafter, spring leaf 37 is lifted while the endface of fiber 14 is brought into contact with that of fiber 12 which is now securely retained by the force of spring leaf 36.

Figure 4:
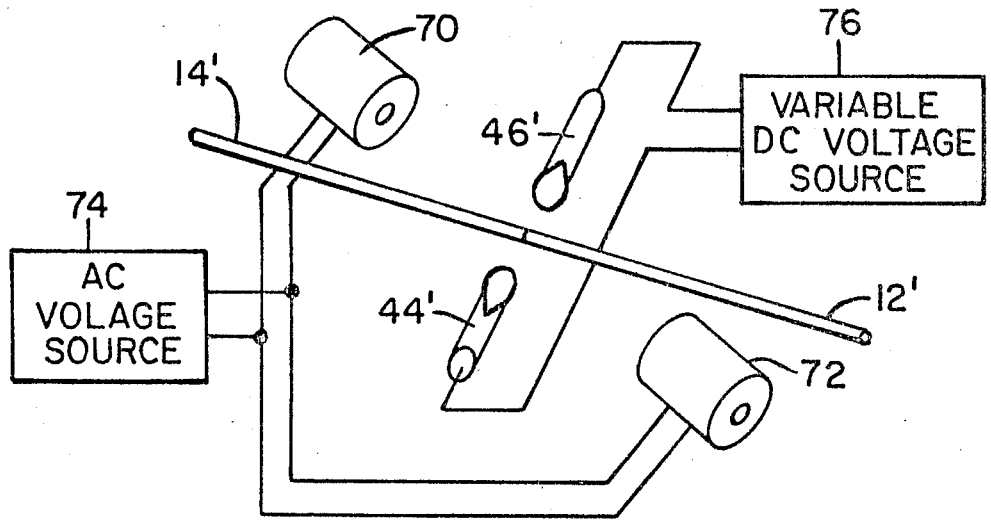
FIG. 4 is an oblique view of another embodiment of the present invention.

Conductive leads 58 and 60 connect electrodes 44 and 46 to a suitable voltage source. The voltage source must be of the type which will produce an arc between electrodes 44 and 46 which will react with a magnetic field having a component parallel to the axes of the fiber end portions to cause the arc to move along the junction between the fiber endfaces. This movement of the arc is facilitated by employing ax-shaped electrodes having flat end portions that lie in the plane of the fiber junction. The magnetic field producing means must be capable of creating at the fiber junction a component of magnetic field parallel to the fiber axes and sufficient in magnitude to deflect the arc along the fiber junction. Thus, when permanent magnets or electromagnets capable of providing a constant magnetic field are employed in the splicing apparatus, electrodes 44 and 46 are connected to an AC voltage source as illustrated in FIG. 3. In the embodiment illustrated in FIG. 4, wherein elements similar to those of FIG. 1 are represented by primed reference numerals, electromagnets 70 and 72 are energized by AC voltage source 74. Electromagnet 70 is disposed just above fiber 14' whereas electromagnet 72 is disposed just below magnet 12'. These two electromagnets produce fields which reinforce in the vicinity of the fiber junction, a large component of the resultant magnetic field being parallel to the fiber axes. Since the magnetic field produced by the embodiment of FIG. 4 varies with time, electrodes 44' and 46' are energized by a DC voltage source 76 so that the arc produced by electrodes 44' and 46' will be continuously deflected and caused to traverse the fiber junction.

One of the most important criteria in making good low loss splices is the quality of the fiber endfaces, a clean and relatively flat endface being essential to a good splice. The fiber endfaces may be prepared by scoring, stressing and bending as discussed by E. L. Chinnock et al. in their publication entitled "Optical Fiber and Preparation for Low-Loss Tape Splices", Bell System Technical Journal, Vol. 54, March 1975, pp. 471–477. Prior to splicing the fibers, any coating thereon must be removed. Conventional plastic coatings, which are applied to fibers to improve their strength, may be removed by dipping the end portions of the fibers into acetone.

The fiber endfaces are brought into contact in the vertical plane in which the ends of electrodes 44 and 46 are disposed. This can be done in any one of a variety of ways. As mentioned hereinabove, the fibers can be aligned by an operator using a microscope to observe and set the fibers. If precisely aligned fiber retaining means are employed, merely disposing the end portions of the fibers in the alignment means will cause them to assume a coaxial orientation. The endface of one of the fibers can then be located in the proper plane by means such as alignment sheet 52. Alternatively, light from a source can be propagated in one of the fibers. Depending upon the alignment of the two fibers, some of the light is coupled to the other fiber across the gap between their endfaces. Proper alignment of the two fibers is determined by maximum light transmission between the fibers as indicated by a maximum reading on an indicator connected to a detector disposed adjacent to the output end of the other fiber.

Having properly aligned the fibers, the endfaces thereof are brought into contact and fused. In accordance with a preferred embodiment the fibers are fused by a two-step process whereby both a low energy arc and a high energy arc are employed. Following is a specific example of such a two-step process. A current of 10 mA with a 1.6 mm spacing between electrodes generates a discharge which is hot enough to soften high silica content fibers. This initial low energy arc is applied for a period of about 10–15 seconds to the fiber ends as they are urged together to close any gap that may exist therebetween, a 10 second duration being sufficient for fibers having endfaces that are perpendicular to the fiber axes. The medium heat of this initially applied arc softens the fibers and makes a cold joint, i.e., the fiber endfaces stick together even when a force is applied which tends to pull them apart, but the optical characteristics of the cold joint are poor since the glass at the fiber endfaces has not become totally fused. The current is then increased to 15 mA while maintaining the same electrode spacing, thereby creating a hot arc capable of melting the glass at their endfaces and causing them to fuse together.

During the time that both the cold joint and the final splice are being made, the effect of the magnetic field on the arc moves the hot, central portion of the arc back and forth across the entire fiber junction. This provides a more gradual heating process and ensures that the entire junction is provided with a sufficient amount of heat for complete fusion to occur. The arc is hot in the center and cooler at the edges, so that the glass is heated slowly to a maximum and then is cooled slowly as the arc passes along the junction. As the fibers are heated they expand axially and make intimate contact as the glass bcomes molten.

It should be understood that the above described embodiments are illustrative of a small number of the many possible specific embodiments which can represent applications of the principles of the present invention. Thus, numerous and varied other arrangements can readily be devised in accordance with these principles by those skilled in the art without departing from the spirit and scope of the invention. For example, either one or both of electrodes 44 and 46 may be pointed as described in said related applicaton. The arc generated between two electrodes, one or both of which are pointed, will also be deflected by a magnetic field as described above; however, a greater deflection is attained by the ax-shaped electrodes of the preferred embodiment. Moreover, other fiber support means such as the V-shaped groove of said related application may be employed in place of the cylinders of means 16 and 18. If such support means were employed with a splicing apparatus of the type which employs permanent magnets, magnetic field producing means other than the cylindrical permanent magnets of FIG. 1 would have to be employed. For example, members 20 and 22 could be permanent magnets, that side of those members facing electrodes 44 and 46 being opposite magnetic poles.

We claim:

1. A method of splicing glass optical fibers comprising the steps of
    aligning the end portions of said fibers so that the axes thereof are substantially parallel and the endfaces thereof are in contact,
    generating an electric field at the junction between said fibers which is of sufficient magnitude to create an electric arc, said arc producing a sufficient amount of heat to melt the endfaces of said fibers, thereby causing said fibers to fuse, and
    generating a magnetic field in the vicinity of said fiber junction, said magnetic field having a component parallel to the axes of said fibers, one of said electric field and said magnetic field varying with respect to time, the other being invariable with respect to time said magnetic field deflecting said arc back and forth along said fiber junction.

2. A method in accordance with claim 1 wherein the step of aligning the end portions of said fibers comprises the step of temporarily inserting a fiber alignment device in the plane in which said electric field is generated, urging the endface of one of said fibers against said alignment device, removing said alignment device, and urging the endface of the other of said fibers against the endface of said one of said fibers.

3. A method in accordance with claim 1 wherein the step of generating an electric field comprises disposing a pair of electrodes on opposite sides of said fiber junction, said electrodes having flattened end portions which lie in the plane of said fiber junction, said magnetic field causing movement of said arc along the end portions of said electrodes.

4. An apparatus for splicing glass optical fibers comprising
    first and second fiber retaining means for retaining the end portions of said fibers so that the axes thereof are substantially parallel and the endfaces thereof are in contact,
    means for generating at the junction between said fibers an electric field of sufficient magnitude to generate an electric arc that is capable of melting the endfaces of said fibers, and
    means for generating in the vicinity of said fiber junction a magnetic field having a component parallel to the axes of said fiber end portions, one of said electric field and said magnetic field being variable with respect to time, the other being invariable with respect to time, said magnetic field being capable of deflecting said arc back and forth across said fiber junction.

5. An apparatus in accordance with claim 4 wherein said first and second fiber retaining means each comprises at least three cylindrically shaped permanent magnets disposed adjacent to one another and forming an aperture therebetween through which a respective fiber passes, an end portion of each fiber protruding from its respective aperture so that the fiber endfaces contact at a plane which lies between said retaining means.

6. An apparatus in accordance with claim 5 wherein each of said magnets is provided with a coating of material which protects said fibers from being scratched.

7. An apparatus in accordance with claim 6 wherein at least one of said magnets in each of said first and second fiber retaining means is movable to permit insertion of a respective fiber in its aperture, said apparatus further comprising spring means for tightly retaining said fibers in their respective apertures.

8. An apparatus in accordance with claim 7 wherein said means for generating an electric field comprises a pair of electrodes disposed in the plane of said fiber junction, and means for energizing said electrodes with an AC voltage.

9. An apparatus in accordance with claim 8 wherein each of said electrodes comprises a flattened, ax-shaped end portion that lies in the plane of said fiber junction.

10. An apparatus in accordance with claim 9 further comprising means for positioning said fiber junction in the plane in which said arc is generated.

11. An apparatus in accordance with claim 4 wherein said means for generating a magnetic field comprises a pair of electromagnets disposed near said fiber junction and a source of AC voltage connected to said electromagnets, said means for generating an electric field comprising a pair of electrodes disposed in the plane of said fiber junction, and means for energizing said electrodes with a DC voltage.

12. An apparatus in accordance with claim 11 wherein each of said electrodes comprises a flattened, ax-shaped end portion that lies in the plane of said fiber junction.

* * * * *